United States Patent [19]

Takizawa

[11] 4,414,746
[45] Nov. 15, 1983

[54] LINEAR SCALE TYPE MEASURING INSTRUMENT

[75] Inventor: Kinji Takizawa, Kanagawa, Japan

[73] Assignee: Mitutoyo Mfg. Co., Ltd., Tokyo, Japan

[21] Appl. No.: 236,920

[22] Filed: Feb. 23, 1981

[30] Foreign Application Priority Data

Feb. 27, 1980 [JP] Japan .............................. 55-24766[U]

[51] Int. Cl.³ ........................ G01B 7/02; G01B 11/02
[52] U.S. Cl. .................................. 33/125 C; 308/6 R
[58] Field of Search ............ 33/125 R, 125 A, 125 C, 33/125 M; 308/6 R

[56] References Cited

U.S. PATENT DOCUMENTS

| | | | |
|---|---|---|---|
| 3,469,611 | 9/1969 | Dunlap | 308/6 R |
| 4,117,601 | 10/1978 | Kober et al. | 33/125 C |
| 4,149,319 | 4/1979 | Nelle | 33/125 C |
| 4,169,316 | 10/1979 | Ernst | 33/125 C |
| 4,189,840 | 2/1980 | Holstein | 33/125 C |
| 4,250,381 | 2/1981 | Yoshiike et al. | 33/125 C |
| 4,276,696 | 7/1981 | Ernst | 33/125 C |

FOREIGN PATENT DOCUMENTS

| | | | |
|---|---|---|---|
| 2810341 | 5/1979 | Fed. Rep. of Germany | 33/125 A |
| 2820753 | 7/1979 | Fed. Rep. of Germany | 33/125 R |
| 591808 | 7/1925 | France | 308/6 R |
| 1388385 | 3/1975 | United Kingdom | 33/125 M |

*Primary Examiner*—Richard R. Stearns
*Attorney, Agent, or Firm*—Koda and Androlia

[57] ABSTRACT

A linear scale type measuring instrument comprising a hollow case, a linear scale housed in said hollow case and a slider movable along said linear scale, wherein at least part of a travel guide mechanism of the slider includes bearings rotatably supported on the slider and a guide bar being circular in cross section, supported by said hollow case and in abutting contact at the outer peripheral surface thereof with portions of rotating surface of the bearings.

5 Claims, 8 Drawing Figures

FIG. I
PRIOR ART

LINEAR SCALE TYPE MEASURING INSTRUMENT

BACKGROUND OF THE INVENTION

1. Field of the Invention

This invention relates to linear scale type measuring instruments, and particularly to improvements in a linear scale type measuring instrument comprising a hollow case, a linear scale housed in the hollow case and a slider movable along the linear scale.

2. Description of the Prior Art

One type of length measuring apparatus for measuring or adjusting relative positions of two objects in the linear scale type measuring instrument. This linear scale type measuring instrument is constructed as shown in FIGS. 1 through 3 for example. In the drawing: designated at 10 is a tubular, hollow aluminum case being substantially rectangular in cross section, formed by cold drawings for example, and fixed one of the members, relative positions of which are to be measured; 12 a glass linear scale received at the lower end thereof in a longitudinal groove 10a formed in the hollow case 10, and elastically bonded to the hollow case 10 through a rubber bar 14 and an elastomeric bonding agent 16 such as silicon rubber; 20 a detecting section fixed to the other member, the relative position of which is to be measured; 22 a slider connected to an arm 20a formed at the lower portion of the detecting section 20 through connecting means comprising a cantilever spring 24, one end of which is fixed to the arm 20a and the other end of which is coupled onto a conical projection 23 for example, and movable along the linear scale 12 in a condition of being biased by the cantilever spring 24 in a direction of being brought into abutting contact with the surface of the linear scale 12; 26 projector elements arranged on the slider 22; 28 an index scale fixed to the slider 22; 30 receptor elements arranged on the slider at positions opposite to the aforesaid projector elements 26 for receiving rays emitted from the projector elements and passed through a graduated scale 12a of the linear scale 12 and a graduated scale of the index scale; 32, 33 sliding blocks constituting a travel guide mechanism for holding a predetermined interval between a graduated surface 12b or an end face of the linear scale serving as a scanning reference surface for the slider 22 and the slider 22; 34 a belt-like steel tape for preventing dust and the like from entering into the hollow case 10 from outside; and 36 magnets embedded in the hollow case 10 for attracting the steel tape 34.

In the conventional linear scale type measuring instrument of the type described, when a relative movement in a direction perpendicular to the paper surface in FIG. 1 is effected between the hollow case 10 fixed to one of the objects moving relatively with each other and the detecting section fixed to the other of the objects; the amount of rays transmitted through the graduated scales of the index scale 28 and of the linear scale 12, which have been emitted from the projector elements 26, are varied, whereby the variations in amount of transmitting rays are detected by the receptor elements 30, so that a relative movement between the hollow case 10 and the detecting section 20 can be measured.

With the linear scale type measuring instrument of the type described, there is such a characteristic feature that the relative displacement value between two objects can be very accurately measured. However, in the conventional linear scale type measuring instrument, the graduated surface 12b of the linear scale 12 and an end face 12c of the linear scale perpendicular to the graduated surface 12b have been used as the scanning reference surface for the slider 22, and hence, in order to improve the degree of accuracy in measurement, it has been necessary to make with a high degree of straightness not only the graduated surface 12b which is finely finished in general but also on the end face 12c of the linear scale, whereby the end face 12c of the linear scale is brought into parallel to the graduated scale 12a accurately. However, as a matter of fact, it is difficult to accurately finish the end face 12c of the linear scale 12, and, even if it is possible to do so, it entails an increase in manufacturing costs to a considerable extent. Particularly, in the case the end face 12c of the linear scale 12 is to be engaged with the slider 22 through the sliding blocks 33 as in the above described example of the prior art, not only straightness but also very fine surface roughness are required from the end face 12c of the linear scale, thus resulting in increased cost to a greater extent.

On the other hand, such a measuring instrument may be proposed that, in which, one of the scanning reference surfaces for the slider 22 is served by the graduated surface 12b of the linear scale 12 similarly to the prior art and the other of the scanning reference surfaces is served by the inner surface 10 of the hollow case 10. However, the hollow case 10 is made of an aluminum material formed by drawing, and hence, sweeps of the hollow case tend to occur in the course of manufacture and there are possibilities of deformations caused to the hollow case due to wear, thus presenting such a disadvantage that it is difficult to achieve a required degree of accuracy in measurement for a long period of time.

SUMMARY OF THE INVENTION

The present invention has been developed to obviate the above described disadvantage of the prior art and has as its object the provision of a linear scale type measuring instrument provided therein with a travel guide mechanism being low in travelling resistance, high in resistance to wear and capable of guiding the slider with high accuracy.

To achieve the abovedescribed object, according to the present invention, in a linear scale type measuring instrument including a hollow case, a linear scale housed in the hollow casing and a slider movable along the linear scale, at least part of a travel guide mechanism of the slider includes ball bearings rotatably supported on the slider and a guide bar being circular in cross section, supported by the hollow case and/or the linear scale and in abutting contact at the outer peripheral surface thereof with portions of the travelling surfaces of the ball bearings.

Furthermore, according to the present invention, the aforesaid guide bar is formed of a polished steel bar, thereby enabling one to obtain an inexpensive guide bar with high accuracy.

DESCRIPTION OF THE PREFERRED EMBODIMENTS

Figure 1:
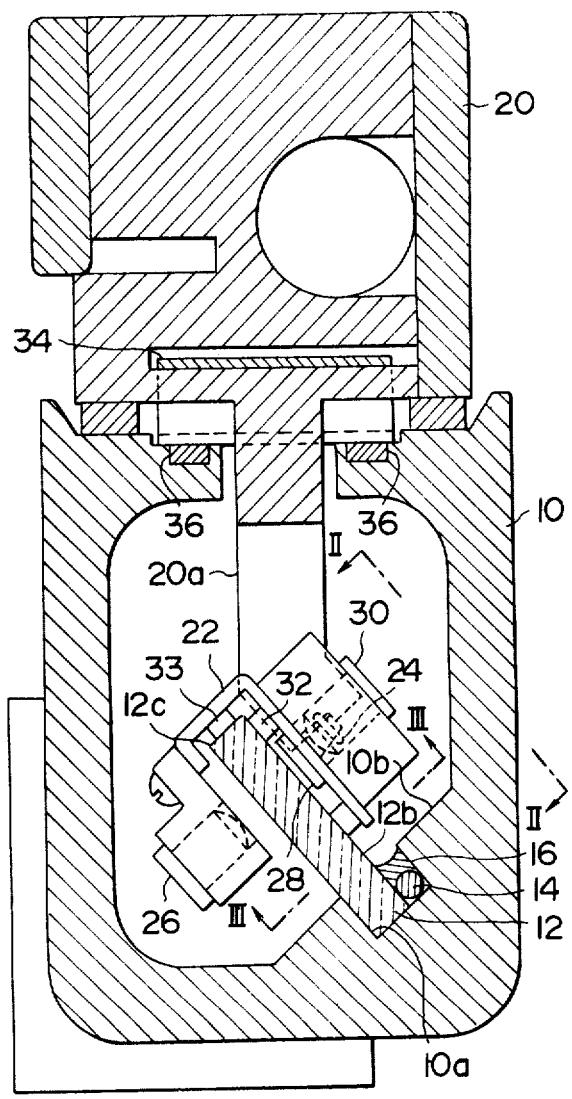
FIG. 1 is a cross-sectional view showing an example of the linear scale type measuring instrument of the prior art.
Figure 2:
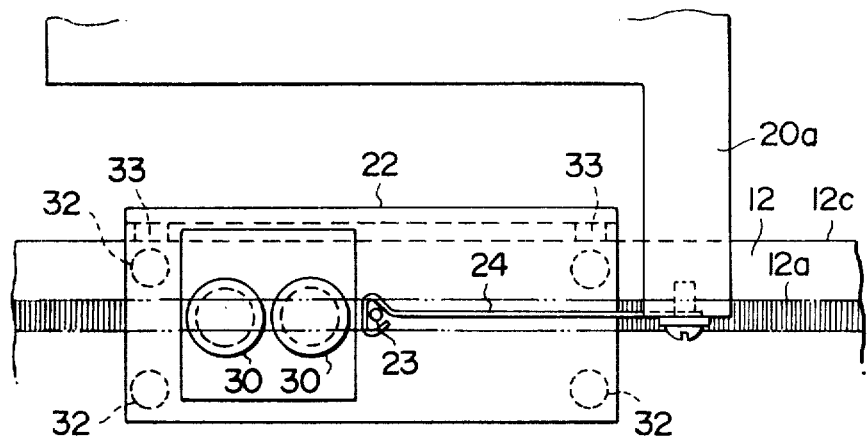
FIG. 2 is a longitudinal sectional view taken along the line II—II in FIG. 1.
Figure 3:
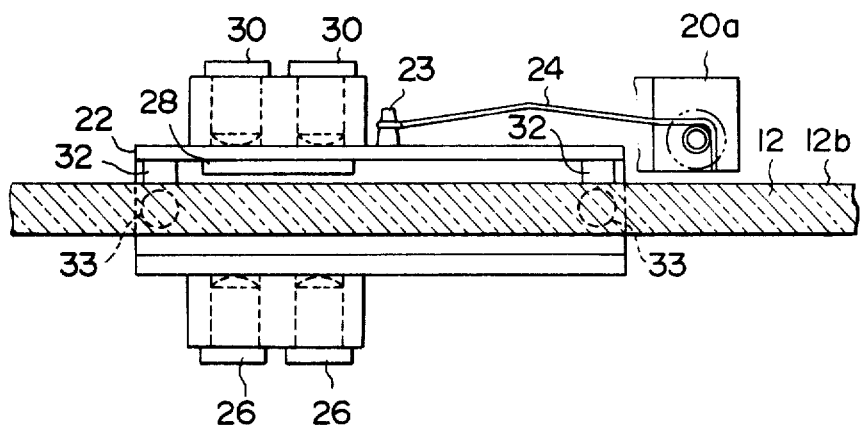
FIG. 3 is a longitudinal sectional view taken along the line III—III in FIG. 1.
Figure 4:
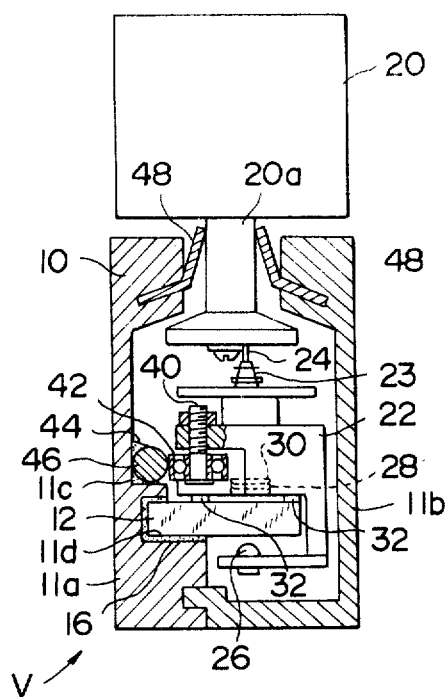
FIG. 4 is a cross-sectional view showing the arrangement of a first embodiment of the linear scale type measuring instrument according to the present invention.
Figure 5:
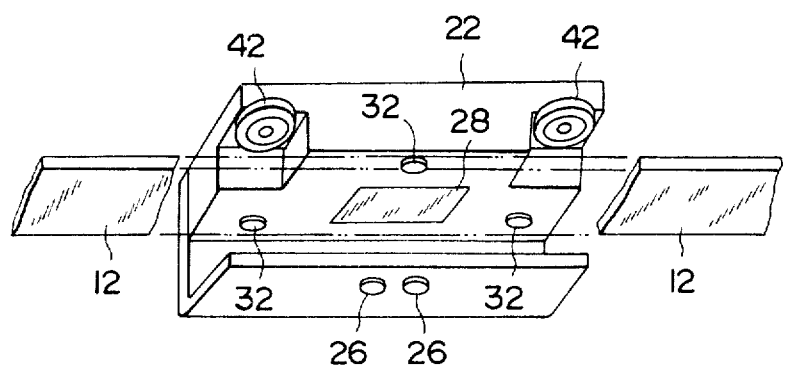
FIG. 5 is a perspective view showing the slider in the aforesaid first embodiments as viewed in the direction of an arrow V in FIG. 4.

Description will hereunder be given of the embodiments in detail with reference to the drawings. As shown in FIGS. 4 and 5, the first embodiment of the present invention is of an arrangement that, in a linear scale type measuring instrument similar to the conventional one, part of the travel guide mechanism of the slider 22 biased to the left and downward in the drawing is formed by sliding blocks 32 made of plastic, for example fixed to the slider 22 in the same manner as in the prior art, and the rest of the travel guide mechanism is formed by bearings rotatably supported on the slider 22 through bolts 40, i.e., ball bearings 42, as shown, and a guide 46 formed of a polished steel bar being circular in cross section, fixed to a stepped portion 11c of the hollow case 10 with a bonding agent 44, and brought into abutting contact at portions of the outer peripheral surface with rotating members of the ball bearings 42. As the aforesaid bearings 42, roller bearings, needle bearings or the like being low in frictional coefficient may be used in addition to the ball bearings. Further, in this embodiment, the hollow case 10 is formed by two case members 11a and 11b each being of substantially a letter 'C' shaped, which are joined at their bottoms to each other, and the linear scale 12 is solidly secured into a groove 11d formed in one of the case members 11a with an elastomeric bonding agent 16 substantially horizontally. Further, a dust-preventing mechanism is formed by a pair of rubber sheets 48 are inserted and held in the upper portions of the case members 11a and 11b which forms the hollow case 10, respectively. Since this embodiment is similar to the aforesaid conventional example in other respects, a detailed description will be omitted.

In this embodiment, the slider 22 is biased by a cantilever spring 24 in the direction of being brought into abutting contact with the linear scale 12 and the guide bar 46, and consequently, the slider 22 is guided in its travel by the combination of the sliding blocks 32 similar to the prior art, and the ball bearings 42 and the guide bar 46 according to the present invention. Accordingly, the contact surfaces are decreased in area and travelling resistance is reduced as compared with the case where the inner surface of the hollow case 10 is directly used as the guiding surface; whereby the movement of the slider is smoother, so that the degree of accuracy in measurement can be improved. Furthermore, a material higher in resistance to wear than the hollow case 10 can be used as the guide bar 46, whereby the danger of deformation due to wear is minimized, so that a high degree of accuracy in measurement can be maintained for a long period of time. Further, the guide bar 46 is a bar material being circular in cross section, whereby sweeps do not tend to occur as compared with the hollow case 10, so that the degree of accuracy in measurement can be further improved.

In this embodiment, a polished steel bar material is used as the guide bar 46, hence, the material can be easily obtained, the material itself is high in dimensional accuracy, and further, there is no need to polish the outer periphery of the material, so that an inexpensive guide with high accuracy can be formed.

Additionally, in this embodiment, the dust-preventing mechanism is formed of rubber sheets 48, whereby the construction is simplified and the detecting section 20 and the arm 20a can be connected to each other through a letter 'I' shaped member, so that the detecting section 20 can be rendered compact in size.

Figure 6:
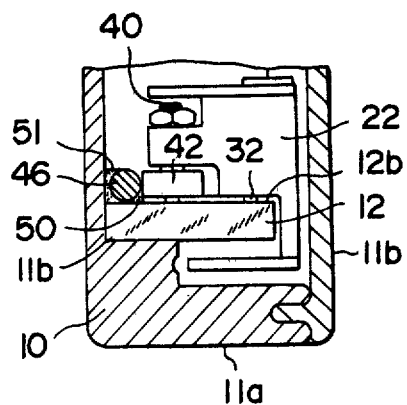
FIG. 6 is a cross-sectional view showing the arrangement of a second embodiment of the linear scale type measuring instrument according to the present invention.

FIG. 6 shows a second embodiment of the present invention. This embodiment is of such an arrangement that, in the linear scale type measuring instrument similar to the first embodiment, firstly, the guide bar 46, constituting the travel guide mechanism of the slider 22, is solidly secured to the graduated surface 12b of the linear scale 12 by use of a bonding agent 50, and then, the linear scale 12 and the guide bar 46, integrally formed with each other by use of the bonding agent 50, are joined by use of a bonding agent 51 to the stepped portion 11d of the case member 11a in which a groove is not provided. This embodiment is similar to the first embodiment in other respects, so that a detailed description will be omitted.

In this embodiment, the guide bar 46 constitutes the travel guide mechanism of the slider 22, and at the same time, presses on the left end of the linear scale 12, so that the groove in the case member 11a can be eliminated, thereby enabling one to simplify the cross-sectional contour of the case member.

Figure 7:
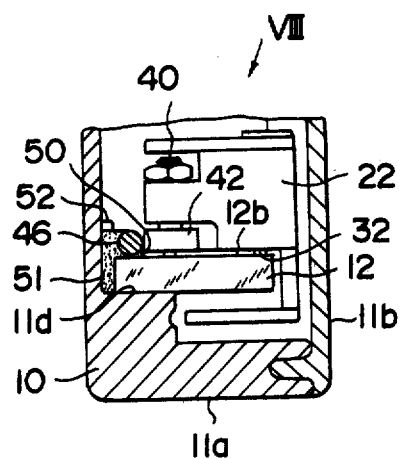
FIG. 7 is a cross-sectional view showing the arrangement of a third embodiment.
Figure 8:
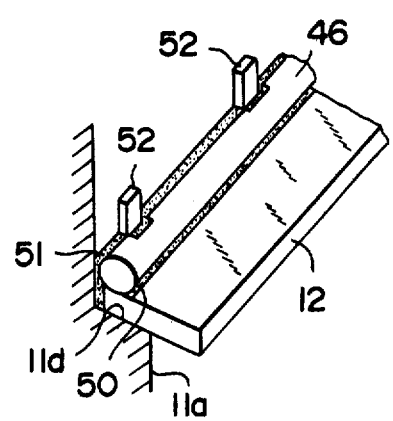
FIG. 8 is a perspective view showing the state where the linear scale and the guide bar are joined to the surface of the hollow case in the aforesaid third embodiment as viewed in the direction of an arrow VIII in FIG. 7.

FIGS. 7 and 8 show a third embodiment of the present invention. This embodiment is of such an arrangement that, in the linear scale type measuring instrument similar to the second embodiment, firstly, the guide bar 46 constituting the travel guide mechanism of the slider 22 is solidly secured to the graduated surface 12b of the linear scale 12 by use of the bonding agent 50, and then, the linear scale 12 and the guide bar 46 integrally formed with each other are joined by use of the bonding agent 51 to the stepped portion 11d of the case member 11a through spacers 52 inserted into a plurality of positions in the longitudinal direction thereof. This embodiment is similar to the second embodiment in other respects, so that a detailed description will be omitted.

In this embodiment, the bonding agent 51 fully fills in a space formed between the linear scale 12 and guide bar 46 and the case member 11a through the agency of the spacers 52, so that a firm bonding can be effected therebetween.

Additionally, in either of the preceding embodiments, part of the travel guide mechanism is provided by the sliding blocks and the rest is provided by the ball bearings and the guide bar. However, the arrangement of the travel guide mechanism is not limited to this, and a predetermined vertical interval may be maintained by the guide bar fixed on the bottom surface of the hollow case and the bearings being low in turning friction coefficient such as ball bearings rotatably supported on the slider 22, with the sliding blocks being omitted. In the respective abovedescribed embodiments, the ball bearings are used as the travel guide mechanism of the slider 22. However, these ball bearings may be replaced with other types of bearings being low in turning friction coefficient, such as roller bearings and needle bearings. In either one of the above described embodiments, the present invention is applied to the linear scale type measuring instrument in which the graduated scale of the index scale is made parallel to the fringes of the graduated scale. However, the range of application of the present invention is not limited to this, and it is apparent that the present invention is similarly applicable to a moire fringe type measuring instrument in which the fringes of the graduated scale of the index scale is provided in an inclined manner to the fringes of the graduated scale of the linear scale.

As has been described hereinabove, according to the present invention, the contact area of the slider at the travel guide mechanism is decreased, whereby the travelling resistance is reduced, so that the movement of the slider can be smoother, thereby enabling the degree of accuracy in measurement to be improved. Furthermore, a material higher in resistance to wear than the hollow case can be used as the guide bar, so that the original performance can be maintained for a long period of time. Further, a bar-shaped material being circular in cross section is used as the guide bar, and hence, such outstanding advantages can be offered that a guide bar having low sweeps and being high in surface accuracy may be inexpensively and easily obtained.

What is claimed is:

1. A linear scale type measuring instrument comprising a hollow case, a linear scale housed in said hollow case, a slider movable on said linear scale and an index scale fixed to said slider facing to a graduated surface of said linear scale, characterized in that at least part of a travel guide mechanism of said slider includes at least two bearings rotatably supported on said slider and a guide bar, being circular in cross-section which is secured by a bonding agent to said hollow case and said linear scale along the longitudinal direction of said linear scale and abutting contact at the outer peripheral surface thereof with rotating members of said bearings, said rotating members being supported on said slider such that they are rotatable about their axes perpendicular to the graduated surface of said linear scale and engagable with said guide bar at portions longitudinally apart from each other, said slider being provided with sliding blocks which are slidably in contact with the graduated surface of said linear scale thereby to maintain a predetermined clearance between said linear scale and said slider.

2. A linear scale type measuring instrument as set forth in claim 1, characterized in that said guide bar is made of a polished steel bar.

3. A linear scale type measuring instrument as set forth in claim 1, characterized in that said bearings are rotatably supported on said slider by ball bearings.

4. A linear scale type measuring instrument as set forth in claim 1, characterized in that said bearings are rotatably supported on said slider by roller bearings.

5. A linear scale type measuring instrument as set forth in claim 1, characterized in that said bearings are rotatably supported on said slider by needle bearings.

* * * * *